United States Patent
Akers et al.

(10) Patent No.: US 7,810,771 B1
(45) Date of Patent: Oct. 12, 2010

(54) SYSTEMS AND METHODS FOR ATTACHING BARRIER SHEET MATERIAL TO EXTENSIBLE POLE ASSEMBLIES

(75) Inventors: Paul Akers, Bellingham, WA (US); Jon Lussier, Bellingham, WA (US)

(73) Assignee: Fastcap, LLC, Bellingham, WA (US)

( * ) Notice: Subject to any disclaimer, the term of this patent is extended or adjusted under 35 U.S.C. 154(b) by 305 days.

(21) Appl. No.: 11/985,943

(22) Filed: Nov. 19, 2007

Related U.S. Application Data

(60) Provisional application No. 60/859,622, filed on Nov. 17, 2006.

(51) Int. Cl.
*E04G 25/00* (2006.01)

(52) U.S. Cl. .................. 248/200.1; 248/188.9; 248/161; 52/DIG. 12; 160/368.1

(58) Field of Classification Search ................. 248/161, 248/188.8, 188.9, 121, 159, 351, 357, 206.5, 248/200.1, 412; 52/DIG. 12; 160/368.1, 160/351, 402; 269/6; 254/114, 116, 93 H
See application file for complete search history.

(56) References Cited

U.S. PATENT DOCUMENTS

| | | | |
|---|---|---|---|
| 827,000 | A | 7/1906 | Dinsmore |
| 1,209,783 | A | 12/1916 | Van Horn |
| 1,209,788 | A | 12/1916 | White |
| 1,398,909 | A | 11/1921 | North |
| 1,500,022 | A | 7/1924 | Woodward |
| 1,766,324 | A | 6/1930 | Berner |
| 2,219,169 | A | 10/1940 | Alter |
| 2,232,194 | A | 2/1941 | Zogby |
| 2,395,689 | A | 2/1946 | Sembower |
| 2,417,922 | A | 3/1947 | Frazer |
| 2,430,027 | A | 11/1947 | Morrison |
| 2,474,158 | A | 6/1949 | Neely |
| 2,777,454 | A | 1/1957 | Kramer |
| 2,816,769 | A | 12/1957 | Noble |
| 2,840,092 | A | 6/1958 | Hill |
| 2,903,227 | A | 9/1959 | De Kalb Key |
| 2,942,829 | A | 6/1960 | Stiffel |
| 3,055,381 | A | 9/1962 | Zielinski |
| 3,072,784 | A | 1/1963 | Mann |

(Continued)

FOREIGN PATENT DOCUMENTS

CH 277237 8/1951

(Continued)

OTHER PUBLICATIONS

Protects Screen Ltd, "Quickprop" Brochure, Aug. 1996.

(Continued)

*Primary Examiner*—Anita M King
(74) *Attorney, Agent, or Firm*—Michael R. Schacht; Schacht Law Office, Inc.

(57) ABSTRACT

A foot assembly for detachably attaching an extensible pole assembly to sheet material comprising a foot member, a first attachment member, and a second attachment member. The foot member is adapted to be attached to the extensible pole assembly. The foot member supports the first attachment member. The second attachment member is magnetically attracted to the first attachment member. The sheet material is arranged between the first and second attachment members. The magnetic attraction between the first and second attachment members holds the sheet material relative to the foot member.

28 Claims, 5 Drawing Sheets

U.S. PATENT DOCUMENTS

| | | | |
|---|---|---|---|
| 3,090,826 A | 5/1963 | Cochran | |
| 3,116,919 A | 1/1964 | Alth | |
| 3,118,363 A | 1/1964 | Burgess, Jr. | |
| 3,124,249 A | 3/1964 | Flashman | |
| 3,247,558 A | 4/1966 | Kaufman | |
| 3,306,180 A | 2/1967 | Asbury | |
| 3,322,381 A | 5/1967 | Bubb | |
| 3,327,310 A | 6/1967 | Bethune et al. | |
| 3,333,808 A | 8/1967 | Du Boff | |
| 3,350,120 A | 10/1967 | Hinrichs | |
| 3,425,428 A | 2/1969 | Schwartz | |
| 3,529,860 A | 9/1970 | Jelley | |
| 3,592,434 A | 7/1971 | Murray | |
| 3,604,397 A | 9/1971 | Salerno | |
| 3,608,991 A | 9/1971 | Wade | |
| 3,636,852 A | 1/1972 | Burgess, Jr. | |
| 3,713,643 A | 1/1973 | Gerstenberger | |
| 3,747,503 A | 7/1973 | Lovell | |
| 3,767,253 A | 10/1973 | Kluetsch | |
| 3,792,510 A | 2/1974 | Evett | |
| 3,822,850 A | 7/1974 | Elias | |
| 3,858,988 A | 1/1975 | Cohen | |
| 3,861,663 A | 1/1975 | Strickland | |
| 3,863,554 A | 2/1975 | Boyd | |
| 3,952,877 A | 4/1976 | Kindl | |
| 3,956,784 A | 5/1976 | Vargas | |
| 3,972,272 A | 8/1976 | Bagby | |
| 3,994,463 A | 11/1976 | Baker | |
| 3,996,631 A | 12/1976 | Fields | |
| 4,078,756 A | 3/1978 | Cross | |
| 4,087,006 A | 5/1978 | Schill | |
| 4,111,217 A | 9/1978 | Victor | |
| 4,111,408 A | 9/1978 | Love | |
| 4,127,911 A | 12/1978 | Cupp et al. | |
| 4,139,101 A | 2/1979 | Towfigh | |
| 4,143,698 A | 3/1979 | Smolka | |
| 4,175,481 A | 11/1979 | Burgess, Jr. | |
| 4,249,578 A | 2/1981 | Freeman | |
| 4,277,863 A | 7/1981 | Faneuf | |
| 4,373,570 A | 2/1983 | Nussdorf et al. | |
| 4,379,654 A | 4/1983 | Rovelli | |
| 4,396,325 A | 8/1983 | Joice-Cavanagh | |
| 4,488,651 A | 12/1984 | Bishop | |
| 4,502,256 A | 3/1985 | Hahn | |
| 4,536,924 A | 8/1985 | Willoughby | |
| 4,576,354 A | 3/1986 | Blessing, Sr. | |
| 4,592,797 A | 6/1986 | Carlson | |
| 4,645,473 A | 2/1987 | Mochizuki | |
| 4,649,678 A | 3/1987 | Lamson | |
| 4,662,034 A | 5/1987 | Cunningham | |
| 4,685,484 A | 8/1987 | Moneta | |
| 4,691,889 A | 9/1987 | Richards | |
| 4,708,189 A | 11/1987 | Ward | |
| 4,715,089 A | 12/1987 | Schema | |
| 4,717,107 A | 1/1988 | Servadio | |
| 4,733,844 A | 3/1988 | Molloy | |
| 4,770,086 A | 9/1988 | Gabster | |
| 4,794,974 A | 1/1989 | Melino | |
| 4,824,302 A | 4/1989 | Schultheis et al. | |
| 4,852,844 A | 8/1989 | Villaveces | |
| 4,874,028 A | 10/1989 | Lynch et al. | |
| 4,885,876 A | 12/1989 | Henke | |
| 4,907,835 A | 3/1990 | Salters | |
| 4,912,814 A | 4/1990 | McKenzie | |
| 4,928,916 A | 5/1990 | Molloy | |
| 4,935,184 A | 6/1990 | Sorensen | |
| 4,969,241 A | 11/1990 | Griffin | |
| 4,974,298 A | 12/1990 | Thallon | |
| 5,033,529 A | 7/1991 | Koschade | |
| 5,038,889 A | 8/1991 | Jankowski | |
| 5,040,915 A | 8/1991 | Stuart et al. | |
| 5,056,753 A | 10/1991 | Lunau et al. | |
| 5,116,012 A | 5/1992 | Offenhauer et al. | |
| 5,129,774 A | 7/1992 | Balseiro et al. | |
| 5,131,781 A | 7/1992 | Klein | |
| 5,150,868 A | 9/1992 | Kaden | |
| 5,170,974 A | 12/1992 | Ruggiero | |
| 5,207,403 A | 5/1993 | Penniman | |
| 5,240,058 A | 8/1993 | Ward | |
| 5,287,614 A | 2/1994 | Ehrlich | |
| 5,299,773 A | 4/1994 | Bertrand | |
| 5,301,915 A | 4/1994 | Bahniuk et al. | |
| 5,308,280 A | 5/1994 | Dotson | |
| 5,322,403 A | 6/1994 | Herde | |
| 5,331,706 A | 7/1994 | Graham | |
| 5,345,989 A | 9/1994 | Brophy | |
| 5,375,303 A | 12/1994 | Shenier | |
| 5,379,491 A | 1/1995 | Solo | |
| 5,384,938 A | 1/1995 | Frederick | |
| 5,388,283 A | 2/1995 | Garnett | |
| 5,404,602 A | 4/1995 | Kondo | |
| 5,469,607 A | 11/1995 | Henningsson et al. | |
| 5,497,537 A | 3/1996 | Robinson et al. | |
| 5,517,722 A * | 5/1996 | Bender | 16/87.2 |
| 5,524,693 A | 6/1996 | Hamilton | |
| 5,529,326 A | 6/1996 | Hwang | |
| 5,536,229 A | 7/1996 | Albergo | |
| 5,542,209 A | 8/1996 | Sheu | |
| 5,555,607 A | 9/1996 | Parveris | |
| 5,558,501 A | 9/1996 | Wang et al. | |
| 5,560,413 A | 10/1996 | Brown | |
| 5,584,456 A | 12/1996 | Stephens | |
| 5,640,826 A | 6/1997 | Hurilla | |
| 5,645,272 A | 7/1997 | Brennan, Sr. | |
| 5,649,780 A | 7/1997 | Schall | |
| 5,666,702 A | 9/1997 | Ming-Chieh | |
| 5,673,741 A | 10/1997 | Cairns | |
| 5,707,032 A | 1/1998 | Ehrlich | |
| 5,715,620 A | 2/1998 | Walker | |
| 5,722,691 A | 3/1998 | Patel | |
| 5,803,653 A | 9/1998 | Zuffetti | |
| 5,884,424 A | 3/1999 | Smith | |
| 5,895,018 A * | 4/1999 | Rielo | 248/206.5 |
| 5,897,085 A | 4/1999 | Cronin | |
| 5,924,469 A | 7/1999 | Whittemore | |
| 5,937,488 A | 8/1999 | Geiger | |
| 5,940,942 A | 8/1999 | Fong | |
| 5,941,434 A | 8/1999 | Green | |
| 5,941,586 A | 8/1999 | Fann | |
| 5,944,464 A | 8/1999 | Cole, Jr. | |
| 5,979,110 A | 11/1999 | Tai | |
| 5,979,854 A | 11/1999 | Lundgren et al. | |
| 6,067,691 A | 5/2000 | Feltman | |
| 6,082,945 A | 7/2000 | Jeffries et al. | |
| 6,152,434 A | 11/2000 | Gluck | |
| 6,164,605 A | 12/2000 | Drake et al. | |
| 6,170,112 B1 | 1/2001 | Mayfield et al. | |
| 6,209,615 B1 | 4/2001 | Whittemore | |
| 6,237,182 B1 | 5/2001 | Cassar | |
| 6,321,823 B1 | 11/2001 | Whittemore | |
| 6,341,401 B1 | 1/2002 | Lin | |
| 6,378,175 B1 | 4/2002 | Vanderpan | |
| 6,467,741 B1 | 10/2002 | Shih | |
| 6,474,609 B1 | 11/2002 | Pinard | |
| 6,508,295 B2 | 1/2003 | Whittemore | |
| 6,523,231 B1 | 2/2003 | Lassiter | |
| 6,564,512 B1 | 5/2003 | Whittemore | |
| 6,942,004 B2 | 9/2005 | Whittemore | |
| 6,953,076 B2 | 10/2005 | Whittemore | |
| 2001/0029640 A1 | 10/2001 | Cassar | |
| 2003/0028988 A1 | 2/2003 | Streutker et al. | |
| 2003/0154588 A1 | 8/2003 | Blacket et al. | |
| 2004/0031892 A1 | 2/2004 | Whittemore et al. | |
| 2004/0065799 A1 | 4/2004 | Whittemore et al. | |

| | | | |
|---|---|---|---|
| 2004/0194418 A1 | 10/2004 | Gouley | |
| 2004/0195476 A1 | 10/2004 | Gouley | |
| 2004/0200585 A1 | 10/2004 | Whittemore | |
| 2005/0077015 A1 | 4/2005 | Melino, Jr. et al. | |

FOREIGN PATENT DOCUMENTS

| | | |
|---|---|---|
| CH | 367617 | 2/1963 |
| DE | 120481 | 5/1900 |
| DE | 2461313 | 7/1976 |
| DE | 3140556 | 4/1983 |
| DE | 3918516 | 12/1990 |
| DE | 4420849 | 12/1995 |
| DE | 29605222 | 6/1996 |
| EP | 182308 | 5/1986 |
| FR | 1296338 | 6/1962 |
| FR | 2411282 | 6/1979 |
| FR | 2594480 | 8/1987 |
| GB | 1042086 | 9/1966 |
| GB | 2026850 | 2/1980 |
| GB | 2156894 | 10/1985 |
| GB | 2256134 | 2/1992 |
| JP | 48027920 | 4/1973 |
| JP | 55016764 | 2/1980 |
| JP | 57038693 | 3/1982 |
| JP | 61013754 | 1/1986 |
| JP | 61117365 | 7/1986 |
| JP | 61217115 | 9/1986 |
| JP | 01157801 | 10/1989 |
| JP | 05086273 | 4/1993 |
| JP | 6108756 | 4/1994 |
| JP | 06057280 | 8/1994 |
| JP | 07001874 | 1/1995 |
| JP | 8052298 | 2/1996 |
| RU | 2033513 | 4/1995 |
| RU | 2052593 | 1/1996 |
| RU | 2123096 | 12/1998 |
| SU | 503986 | 2/1976 |
| SU | 823543 | 4/1981 |
| SU | 961656 | 10/1982 |
| SU | 1302315 | 4/1987 |
| SU | 1725741 | 4/1992 |
| SU | 1728437 | 4/1992 |
| SU | 1747640 | 7/1992 |
| WO | 8603538 | 6/1986 |
| WO | 9010770 | 9/1990 |
| WO | 9109556 | 7/1991 |

OTHER PUBLICATIONS

Fastwall Temporary Wall Systems, Website http://www.fastwall.net/?p=home, Aug. 4, 2005, 1 page.
Dust free Badrenovierung, Dust shield doors with zipper, Website http://babelfish.altavista.com/babelfish/trurl_pagecontent?lp=de_en&url=http%3A%2F%2F..., Aug. 5, 2005, 3 pages.
CURTAIN-WALL.COM, History of, Website http://www.curtain-wall.com/profile.htm, Aug. 4, 2005, 1 page.
DECONTA.COM, Dust protection-wall Plan, Website http://www.deconta.com/staubschutzwand_E.htm, Aug. 5, 2005, 2 pages.
Filmtech, Temporary Wall System, Website http://www.filmtechonline.com/subpgs/b_temporarywallsystem.html, Aug. 4, 2005, 2 pages.
CURTAIN-WALL.COM, Speedy Wall, Website http://www.curtain-wall.com/speedysystem.htm, Aug. 4, 2005, 3 pages.
CURTAIN-WALL.COM, Curtain-Wall, Website http://www.curtain-wall.com/curtain-wall.htm, Aug. 4, 2005, 4 pages.
Lux, Horizontal support for door casing, Website http://lux-produkte.emil-lux.de/werkzeugkatalog_public/transform.asp?IngConObjID=-1&1..., Aug. 4, 2005, 3 pages.
Westfalia, Telescope-high-speedstretch-support 2 pieces, Website http://babelfish.altavista.com/babelfish/trurlpagecontent?lp=de en&trurl=http%3a%2f%2fwerkzeug.maxi-baumarkt.de%2fpage..., Aug. 5, 2005, 2 pages.

* cited by examiner

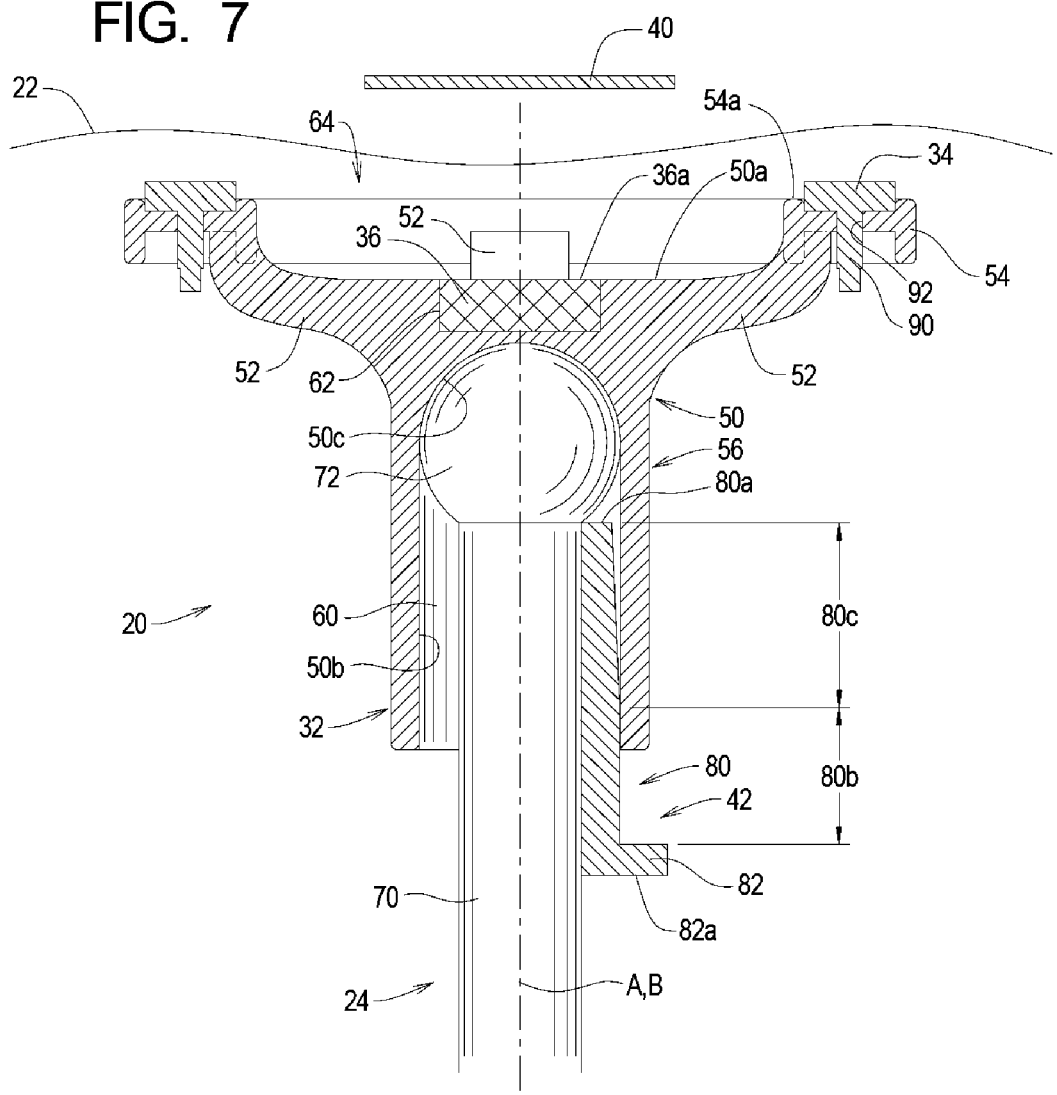

US 7,810,771 B1

SYSTEMS AND METHODS FOR ATTACHING BARRIER SHEET MATERIAL TO EXTENSIBLE POLE ASSEMBLIES

RELATED APPLICATIONS

This application claims priority of U.S. Provisional Application Ser. No. 60/859,622 filed Nov. 17, 2006, the contents of which are incorporated herein by reference.

TECHNICAL FIELD

The present invention relates to systems and methods of supporting sheet material to form a barrier and, in particular, to attachment systems and methods that facilitate the temporary connection of sheet material to an extensible pole assembly during erection of the barrier.

BACKGROUND OF THE INVENTION

An extensible pole assembly typically comprises first and second extension members. One of the first and second extension members is slidably received by the other extension member. An extensible pole assembly may comprise more than two extension members, and one of the extension members is typically telescopically received within the other extension member.

An effective length of the extensible pole assembly is defined by the first and second extension members, and this effective length can be changed by sliding the extension members relative to each other. In use, the extensible pole assembly is typically in compression between two objects, and a locking system is used to lock the extension members together to fix the effective length of the extensible pole assembly between the two objects.

First and second foot assemblies are typically attached to the free ends of the first and second extension members, respectively. The foot assemblies define foot portions adapted to engage the shape and surface characteristics of object against which the foot assembly is forced.

Additionally, an advancing system may be arranged between one or both of the free ends of the extension members and the foot assembly associated therewith. If used, the advancing system allows the foot assembly to be displaced in short increments relative to the extension member associated therewith; the foot assembly is securely held in place after each advancement to ensure that the extensible pole assembly is kept in tension during operation of the advancing system.

Extensible pole assemblies are used during a variety of construction activities, such as maintaining a workpiece in place and/or displacing a workpiece. One use of an extension pole is to hold a portion of a barrier sheet in position relative to a structure to the structure into smaller areas. For example, the remodel of a structure may require the construction activities to overlap in time with normal use of the structure as a dwelling or work place. Construction activities can result in contamination of the air that can be a nuisance to people in the area of these activities. Accordingly, a barrier sheet may be installed within the structure to divide the structure into a construction area and a non-construction area. The barrier sheet will thus inhibit movement of contaminated air between the construction and non-construction areas.

To support the barrier sheet within a structure, one or more extensible pole assemblies are typically extended between the floor and the ceiling structure. The barrier sheet is held against the ceiling by the uppermost portions of the extensible pole assemblies.

The need thus exists for improved systems and methods for facilitating the use of general purpose extensible pole assemblies to support a barrier sheet.

SUMMARY

The present invention may be embodied as a foot assembly for detachably attaching an extensible pole assembly to sheet material comprising a foot member, a first attachment member, and a second attachment member. The foot member is adapted to be attached to the extensible pole assembly. The foot member supports the first attachment member. The second attachment member is magnetically attracted to the first attachment member. The sheet material is arranged between the first and second attachment members. The magnetic attraction between the first and second attachment members holds the sheet material relative to the foot member.

BRIEF DESCRIPTION OF THE DRAWINGS

FIG. 7 is a section view similar to FIG. 5 illustrating disengagement of the example attachment system depicted in FIG. 1 from the sheet material.

DETAILED DESCRIPTION

Figure 1:
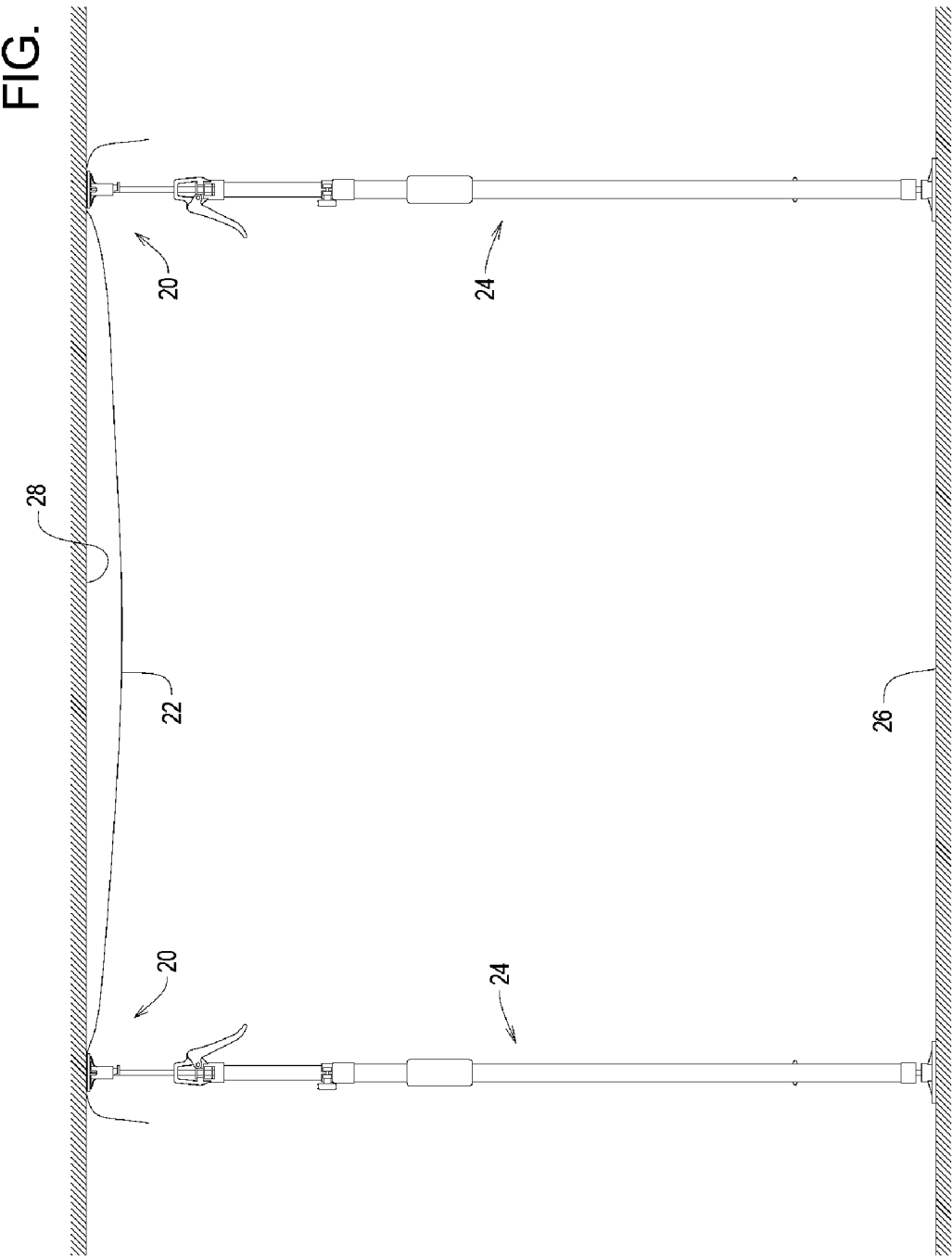
FIG. 1 is a side elevation view depicting an example barrier system in which an attachment system of the present invention may be used.
Figure 5:
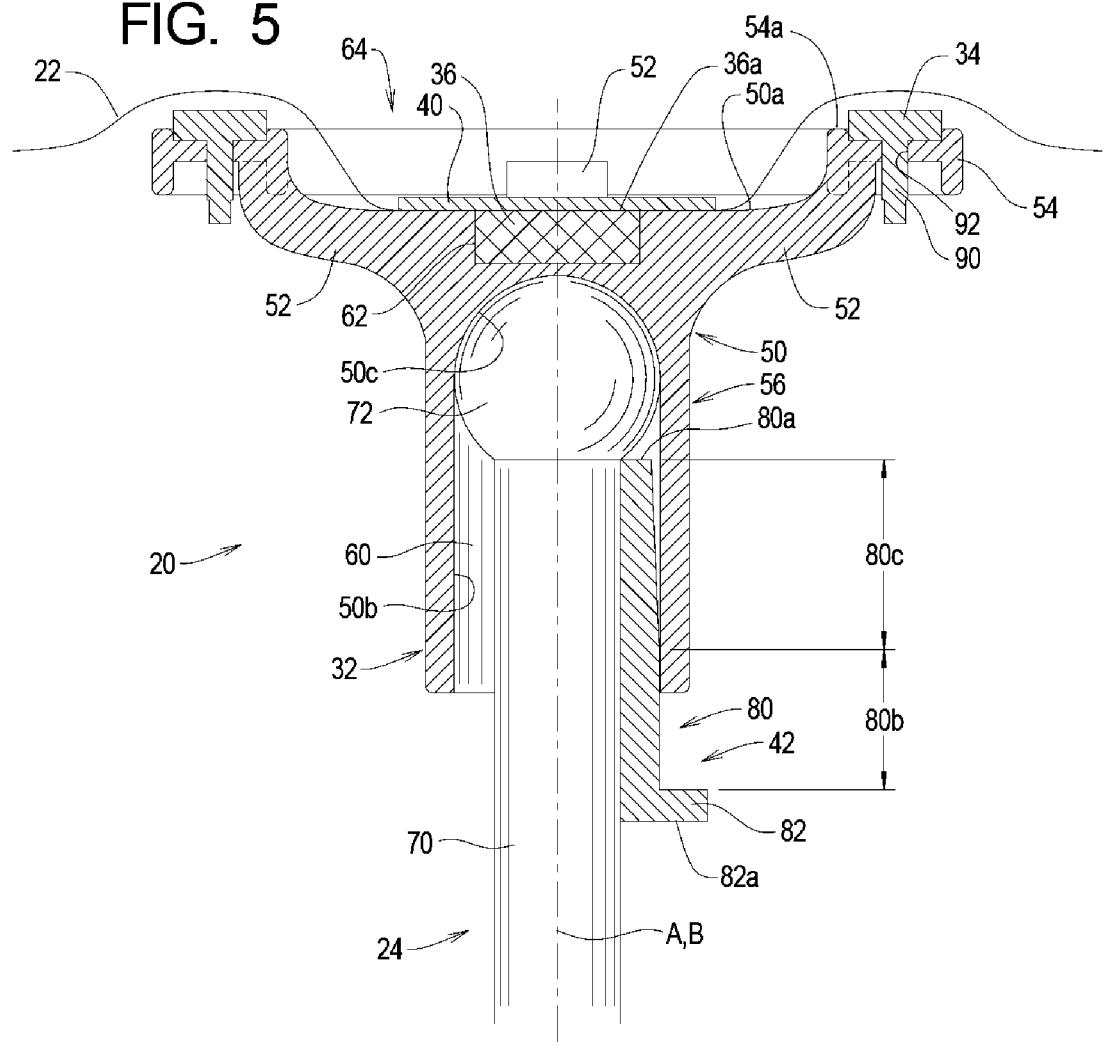
FIG. 5 is a section view taken along lines 5-5 in FIG. 3 illustrating engagement of the example attachment system depicted in FIG. 1 with an extensible pole assembly and sheet material.

Referring initially to FIGS. 5 and 7 of the drawing, depicted therein is an attachment system 20 for detachably attaching a sheet material 22 to an extensible pole member 24 forming part of an extensible pole assembly. FIG. 1 illustrates that a plurality of such attachment systems 20 may be used with a plurality of such extensible pole assembly members 24 to support the sheet material 22 relative to floor and ceiling surfaces 26 and 28. So supported, the sheet material 22 may be arranged to form a barrier system. The barrier system formed by the sheet material 22 is conventional and will not be described herein beyond what is necessary for a complete understanding of the construction and operation of the present invention.

Figure 4:
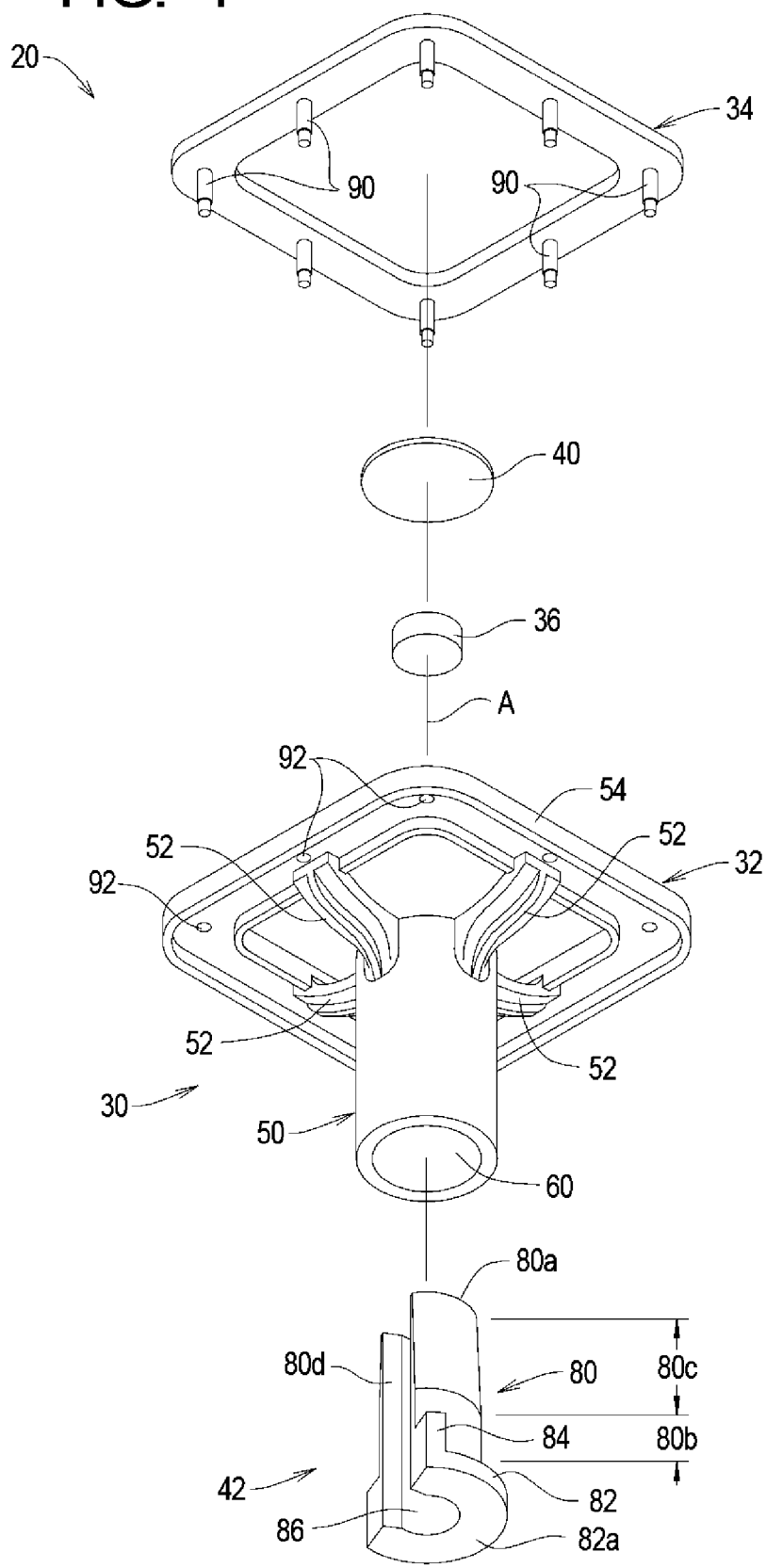
FIG. 4 is an exploded bottom perspective view of the example attachment system depicted in FIG. 1.

FIG. 4 illustrates that the example attachment system 20 comprises a foot assembly 30 comprising a foot member 32, an optional pad member 34, and a first attractable member 36. FIG. 4 further illustrates that the example attachment system 20 further comprises a second attractable member 40 and an optional clip member 42.

FIGS. 4, 5, and 7 illustrate that the example foot member 32 comprises a body portion 50 from which extends at least one arm portion 52 that supports a flange portion 54. The body portion 50 defines a connecting portion 56 and a longitudinal axis A of the attachment system 20. The example foot member 32 comprises four of the arm portions 52.

The example body portion 50 defines a first body cavity 60 and a second body cavity 62. The flange portion 54 defines a flange opening 64. As will be described in further detail below, the example first body cavity 60 is adapted to allow the connecting portion 56 to engage an end of the extensible pole member 24. The second body cavity 62 is sized and dimensioned to receive the first attractable member 36. The flange opening 64 is sized and dimensioned to allow the second attractable member 40 to pass through the flange opening 64.

Figure 2:
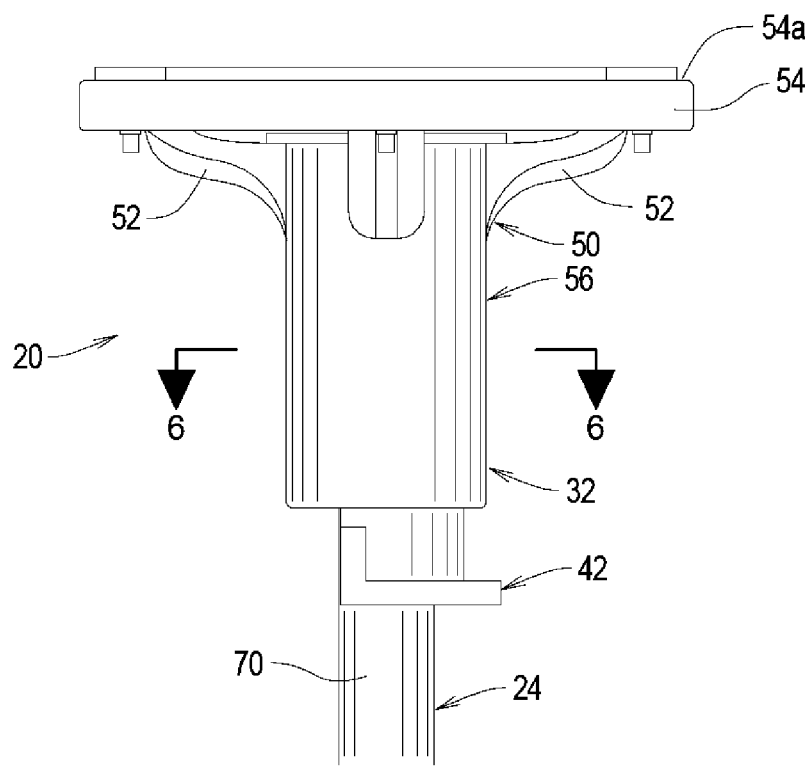
FIG. 2 is a side elevation view of an example attachment system of the present invention.
Figure 3:
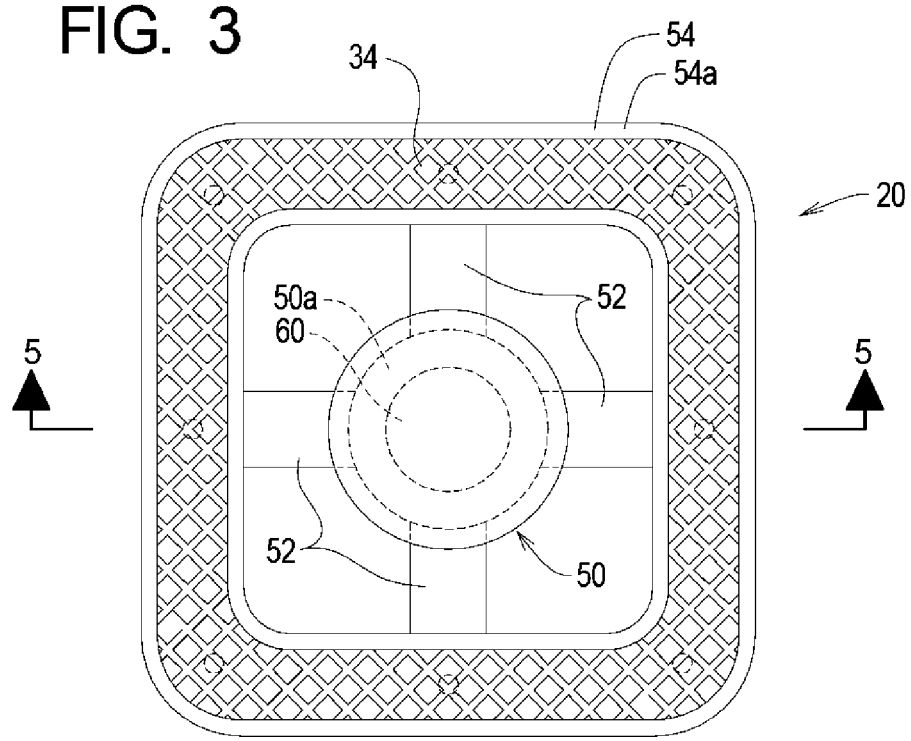
FIG. 3 is a top plan view of the example attachment system depicted in FIG. 1.

As perhaps best shown in FIGS. 2, 5, and 7, the arm portions 52 are configured to space the flange portion 54 from the body portion 50 such that an upper surface 50a of the body portion 50 is spaced from an upper surface 54a of the flange portion 54 along the longitudinal axis A. The second body cavity 62 is formed in the upper surface 50a of the body portion 50 along the longitudinal axis A. In the example foot member 32, the first attractable member 36 is snugly received within the second body cavity 62 with an exposed surface 36a of the member 36 flush with the upper surface 50a of the body portion 50.

The example arm portions 52 are made of a resilient material. Accordingly, while the upper surface 50a of the body portion 50 is parallel to the upper surface 54a of the flange portion 54 when no asymmetrical forces are applied to the flange portion 54, the upper surface 54a of the flange portion 54 may be at an angle relative to the upper surface 50a of the body portion 50 when asymmetrical forces are applied to the flange portion 54. The resilient arm portions 52 thus allow the foot member 32 to deflect or deform such that an angle between the upper surface 54a of the flange portion is at an angle of other than 90 degrees relative to the longitudinal axis A.

The exact configuration of the connecting portion 56 is not critical to any particular implementation of an attachment system of the present invention. The example first body cavity 60 formed in the connecting portion is defined by a generally cylindrical inner side wall surface 50b and rounded inner end wall surface 50c of the body portion 50. The first body cavity 60 is thus designed to receive an end of the extensible pole member 24 such that, at least while the pole member 24 is in compression, the foot assembly 30 stays in place during the process of assembling a barrier system.

The example extensible pole member 24 comprises a shaft portion 70 that terminates at its upper end in a ball portion 72. The diameter of the inner side wall surface 50b of the first body cavity 60 is approximately the same as a diameter of the ball portion 72, and the inner end wall surface 50c of the first body cavity 60 is defined by a radius of curvature that is approximately the same as that of the ball portion 72. The first body cavity 60 thus allows the ball portion 72 to come into contact with the end wall surface 50c thereof as shown in FIGS. 5 and 7.

In many situations, the engagement of the shaft portion 70 and ball portion 72 of the extensible pole member 24 with the first body cavity 60 to foot member 32 will be sufficient to allow a barrier system to be formed using the foot assembly 30. However, to form a more rigid connection between the foot assembly 30 and the extensible pole member 24, the optional clip member 42 may be used.

As perhaps best shown in FIG. 4, the example clip member 42 comprises a clip portion 80, a radial flange portion 82, and a longitudinal flange portion 84. A channel 86 extends through the clip portion 80 from a flange surface 82a on the radial flange portion 82 to a tip surface 80a on the clip portion 80. The clip portion 80 defines a cylindrical surface portion 80b and a tapered surface portion 80c. Guide surfaces 80d and 80e are formed on the clip portion 80 on either side of the channel 86.

A distance between the guide surfaces 80c and 80d is slightly smaller than a diameter of the shaft portion 70 of the extensible pole member 24, and a diameter of the channel 86 is substantially the same as a diameter of the shaft portion 70. Additionally, an outer diameter of the cylindrical surface portion 80b of the clip portion 80 is substantially the same as the diameter of the inner side wall surface 50b, while a diameter of the tapered surface portion 80c decreases away from the cylindrical surface portion 80b.

In use, the guide surfaces 80d and 80e are brought into contact with the shaft portion 70 of the extensible pole member 24. The application of deliberate manual pressure on the clip portion 80 towards the extensible pole assembly causes the clip portion 80 to deform slightly such that the guide surfaces 80d and 80e separate sufficiently to allow the shaft portion 70 to enter the channel 86. At this point, the clip member 42 may be slid up such that first the tapered surface portion 80c and then the cylindrical surface portion 80b enters the first body cavity 60. At this point, the tip surface 80a on the clip member 42 engages the ball portion 72 of the extensible pole assembly as shown in FIGS. 5 and 7.

Figure 6:
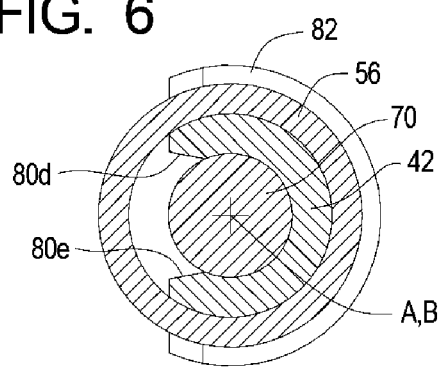
FIG. 6 is a section view taken along lines 6-6 in FIG. 2.

FIG. 6 shows that the clip member 42 snugly occupies the space that would otherwise exist between the inner side wall surface 50b and the surface of the shaft portion 70 of the extensible pole member 24. Friction between the clip member 42, pole shaft portion 70, and the inner side wall surface 50b thus inhibits movement of the foot member 32 relative to the extensible pole member 24. At this point, a longitudinal axis B of the extensible pole member 24 is substantially aligned with the longitudinal axis A of the foot member 32.

As depicted in FIGS. 2, 5, and 7, the pad member 34 may be attached to the upper surface 54a of the flange portion 54. The example pad member 34 is made of resiliently compressible material and may reduce the likelihood of damage to the ceiling surface 28 by the foot assembly 30. The pad member may be glued or otherwise connected to the flange upper surface 54a; the example pad member 34 is secured to the flange portion 54 by projections 90 that extend into corresponding holes 92 (FIG. 4) in the flange portion 54.

As shown in FIGS. 5 and 7, the sheet material 22 is detachably attached to the foot assembly 30 by arranging a portion of the sheet material 22 above the flange opening 64 and then bringing the second attractable member 40 into proximity with the first attractable member 36. The members 36 and 40 attract each other such that, when they are brought into proximity with each other, the attraction force clamps the sheet material 22 between the attractable members 36 and 40 (FIG. 5) to attach the sheet material 22 to the end of the extensible pole assembly 24. However, deliberate application of manual force may be used to pull the second attractable member 40 away from the first attractable member 36 as shown in FIG. 7 to detach sheet material 22 from the end of the extensible pole assembly 24.

In the example system 20, one of the first and second attractable members 36 and 40 is a magnet and the other of the first and second attractable members 40 is a piece of metal that is magnetically attracted to the magnet. By making the first attractable member 36 a magnet and the second attractable member 36 a metal disc, any small piece of metal (e.g., nut, washer, plug) may be used as the second attractable member 36 should the original metal disk become lost.

The spacing of the upper surface 50a of the body portion 50 from the upper surface 54a of the flange portion 54 described above creates a cavity between the body upper surface 50a when the foot assembly 30 engages the ceiling surface 28. This cavity accommodates the second attractable member 36 depicted in FIGS. 4, 5, and 7 and many other sizes and shapes of second attractable members without allowing the second attractable member to come into contact with the ceiling surface 28.

If the extensible pole assembly 24 is not perfectly vertical, the longitudinal axis B of the pole 24 may be at an angle relative to the ceiling surface 28. To accommodate this angle and still allow the flange upper surface 54a to be parallel to the ceiling surface 28, the arm portions 52 can deform slightly as generally described above.

The scope of the present invention should be determined by the claims appended hereto and not the foregoing detailed description.

What is claimed is:

1. A foot assembly for detachably attaching an extensible pole assembly to sheet material comprising:
    a foot member adapted to be attached to the extensible pole assembly, where the foot member defines a foot member cavity;
    a first attachment member; and
    a second attachment member; wherein
    the foot member supports the first attachment member;
    the second attachment member is magnetically attracted to the first attachment member;
    the sheet material is arranged between the first and second attachment members;
    the magnetic attraction between the first and second attachment members holds the sheet material relative to the foot member; and
    the second attachment member is arranged substantially within the foot member cavity when the sheet material is held relative to the foot member.

2. A foot assembly as recited in claim 1, in which the foot member defines:
    a longitudinal axis;
    a first surface; and
    a second surface; wherein
    the second surface is spaced from the first surface along the longitudinal axis;
    the second attachment member holds the sheet material against the first surface when the sheet material is held relative to the foot member;
    the sheet material is held between the second surface and an object when the sheet material is supported in a barrier configuration; and
    the second surface is spaced from the object when the sheet material is supported in the barrier configuration.

3. A foot assembly as recited in claim 1, in which the foot member defines:
    a body portion defining a body cavity;
    a flange portion defining a flange opening; and
    at least one arm portion that supports the flange portion relative to the body portion; wherein
    the body cavity is sized and dimensioned to receive an upper end of the extensible pole; and
    the second attachment member is passed through the flange opening when the sheet material is supported in the barrier configuration.

4. A foot assembly as recited in claim 3, in which:
    the foot member defines a longitudinal axis;
    the body portion defines a first surface; and
    the flange portion defines a second surface; wherein
    the second surface is spaced from the first surface along the longitudinal axis;
    the second attachment member holds the sheet material against the first surface when the sheet material is held relative to the foot member;
    the sheet material is held between the second surface and an object when the sheet material is supported in a barrier configuration; and
    the second surface is spaced from the object when the sheet material is supported in the barrier configuration.

5. A foot assembly as recited in claim 3, in which the at least one arm portion is resilient.

6. A foot assembly as recited in claim 1, in which:
    the first attachment member is a magnet; and
    the second attachment member is a magnetically attractable member.

7. A foot assembly as recited in claim 1, further comprising a clip member adapted to engage the extensible pole and the foot member to maintain the foot member in a desired relationship relative to the extensible pole.

8. A barrier system comprising:
    at least one extensible pole assembly;
    sheet material;
    a foot member attached to the at least one extensible pole assembly, where the foot member defines a foot member cavity;
    a first attachment member; and
    a second attachment member; wherein
    the foot member supports the first attachment member;
    the second attachment member is magnetically attracted to the first attachment member;
    the sheet material is arranged between the first and second attachment members;
    the magnetic attraction between the first and second attachment members holds the sheet material relative to the foot member; and
    the second attachment member is arranged substantially within the foot member cavity when the sheet material is held relative to the foot member.

9. A barrier system as recited in claim 8, in which the foot member defines:
    a longitudinal axis;
    a first surface; and
    a second surface; wherein
    the second surface is spaced from the first surface along the longitudinal axis;
    the second attachment member holds the sheet material against the first surface when the sheet material is held relative to the foot member;
    the sheet material is held between the second surface and an object when the sheet material is supported in a barrier configuration; and
    the second surface is spaced from the object when the sheet material is supported in the barrier configuration.

10. A barrier system as recited in claim 8, in which the foot member defines:
    a body portion defining a body cavity;
    a flange portion defining a flange opening; and
    at least one arm portion that supports the flange portion relative to the body portion; wherein
    the body cavity is sized and dimensioned to receive an upper end of the extensible pole; and
    the second attachment member is passed through the flange opening when the sheet material is supported in the barrier configuration.

11. A barrier system as recited in claim 10, in which:
    the foot member defines a longitudinal axis;
    the body portion defines a first surface; and
    the flange portion defines a second surface; wherein
    the second surface is spaced from the first surface along the longitudinal axis;

the second attachment member holds the sheet material against the first surface when the sheet material is held relative to the foot member;

the sheet material is held between the second surface and an object when the sheet material is supported in a barrier configuration; and the second surface is spaced from the object when the sheet material is supported in the barrier configuration.

12. A barrier system as recited in claim 10, in which the at least one arm portion is resilient.

13. A barrier system as recited in claim 8, in which:
the first attachment member is a magnet; and
the second attachment member is a magnetically attractable member.

14. A barrier system as recited in claim 8, further comprising a clip member adapted to engage the extensible pole and the foot member to maintain the foot member in a desired relationship relative to the extensible pole.

15. A barrier system as recited in claim 8, comprising:
a plurality of extensible poles; and
a foot member, a first attachment member, and a second attachment member for each of the extensible poles; wherein
each extensible pole is arranged between a floor surface and a ceiling surface to support a portion of the sheet material.

16. A method of forming a barrier comprising the steps of:
providing at least one extensible pole assembly;
attaching a foot member to the at least one extensible pole assembly, where the foot member defines a foot member cavity;
supporting a first attachment member on each foot member; and
arranging a barrier member adjacent to each foot member;
arranging a second attachment member adjacent to each foot member, where
the second attachment member is magnetically attracted to the first attachment member;
the magnetic attraction between the first and second attachment members holds the sheet material relative to the foot member; and
the second attachment member is arranged substantially within the foot member cavity when the sheet material is held relative to the foot member; and
with the sheet member held relative to the foot member, arranging the at least one extensible pole assembly in a desired location between a floor surface and a ceiling surface.

17. A method as recited in claim 16, further comprising the step of engaging a clip member with the extensible pole and the foot member to maintain the foot member in a desired relationship relative to the extensible pole.

18. A foot assembly for detachably attaching an extensible pole assembly to sheet material comprising:
a foot member adapted to be attached to the extensible pole assembly, where the foot member defines
a longitudinal axis,
a first surface, and
a second surface, where the second surface is spaced from the first surface along the longitudinal axis;
a first attachment member; and
a second attachment member; wherein
the foot member supports the first attachment member;
the second attachment member is magnetically attracted to the first attachment member;
the sheet material is arranged between the first and second attachment members;

the magnetic attraction between the first and second attachment members holds the sheet material relative to the foot member;

the second attachment member holds the sheet material against the first surface when the sheet material is held relative to the foot member;

the sheet material is held between the second surface and an object when the sheet material is supported in a barrier configuration; and the second surface is spaced from the object when the sheet material is supported in the barrier configuration.

19. A foot assembly for detachably attaching an extensible pole assembly to sheet material comprising:
a foot member adapted to be attached to the extensible pole assembly, where the foot member defines
a body portion defining a body cavity, where the body cavity is sized and dimensioned to receive an upper end of the extensible pole,
a flange portion defining a flange opening, and
at least one arm portion that supports the flange portion relative to the body portion; and
a first attachment member; and
a second attachment member; wherein
the foot member supports the first attachment member;
the second attachment member is magnetically attracted to the first attachment member;
the sheet material is arranged between the first and second attachment members; and
the magnetic attraction between the first and second attachment members holds the sheet material in a barrier configuration relative to the foot member; and
the second attachment member is passed through the flange opening when the sheet material is supported in the barrier configuration.

20. A foot assembly as recited in claim 19, in which:
the foot member defines a longitudinal axis;
the body portion defines a first surface; and
the flange portion defines a second surface; wherein
the second surface is spaced from the first surface along the longitudinal axis;
the second attachment member holds the sheet material against the first surface when the sheet material is held relative to the foot member;
the sheet material is held between the second surface and an object when the sheet material is supported in a barrier configuration; and
the second surface is spaced from the object when the sheet material is supported in the barrier configuration.

21. A foot assembly as recited in claim 19, in which the at least one arm portion is resilient.

22. A foot assembly for detachably attaching an extensible pole assembly to sheet material comprising:
a foot member adapted to be attached to the extensible pole assembly;
a first attachment member;
a second attachment member; and
a clip member; wherein
the foot member supports the first attachment member;
the second attachment member is magnetically attracted to the first attachment member;
the sheet material is arranged between the first and second attachment members;
the magnetic attraction between the first and second attachment members holds the sheet material relative to the foot member; and the clip member is adapted to engage the extensible pole and the foot member to maintain the foot member in a desired relationship relative to the extensible pole.

23. A barrier system comprising:
   at least one extensible pole assembly;
   sheet material;
   a foot member attached to the at least one extensible pole assembly, where the foot member defines
      a longitudinal axis,
      a first surface, and
      a second surface, where the second surface is spaced from the first surface along the longitudinal axis;
   a first attachment member; and
   a second attachment member; wherein
   the foot member supports the first attachment member;
   the second attachment member is magnetically attracted to the first attachment member;
   the sheet material is arranged between the first and second attachment members;
   the magnetic attraction between the first and second attachment members holds the sheet material relative to the foot member;
   the second attachment member holds the sheet material against the first surface when the sheet material is held relative to the foot member;
   the sheet material is held between the second surface and an object when the sheet material is supported in a barrier configuration; and
   the second surface is spaced from the object when the sheet material is supported in the barrier configuration.

24. A barrier system comprising:
   at least one extensible pole assembly;
   sheet material;
   a foot member attached to the at least one extensible pole assembly, where the foot member comprises
      a body portion defining a body cavity, where the body cavity is sized and dimensioned to receive an upper end of the extensible pole,
      a flange portion defining a flange opening, and
      at least one arm portion that supports the flange portion relative to the body portion;
   a first attachment member; and
   a second attachment member; wherein
   the foot member supports the first attachment member;
   the second attachment member is magnetically attracted to the first attachment member;
   the sheet material is arranged between the first and second attachment members;
   the magnetic attraction between the first and second attachment members supports the sheet material in a barrier configuration relative to the foot member; and
   the second attachment member is passed through the flange opening when the sheet material is supported in the barrier configuration.

25. A barrier system as recited in claim 24, in which:
   the foot member defines a longitudinal axis;
   the body portion defines a first surface; and
   the flange portion defines a second surface; wherein
   the second surface is spaced from the first surface along the longitudinal axis;
   the second attachment member holds the sheet material against the first surface when the sheet material is held relative to the foot member;
   the sheet material is held between the second surface and an object when the sheet material is supported in a barrier configuration; and
   the second surface is spaced from the object when the sheet material is supported in the barrier configuration.

26. A barrier system as recited in claim 24, in which the at least one arm portion is resilient.

27. A barrier system comprising:
   at least one extensible pole assembly;
   sheet material;
   a foot member attached to the at least one extensible pole assembly;
   a first attachment member;
   a second attachment member; and
   a clip member; wherein
   the foot member supports the first attachment member;
   the second attachment member is magnetically attracted to the first attachment member;
   the sheet material is arranged between the first and second attachment members;
   the magnetic attraction between the first and second attachment members holds the sheet material relative to the foot member; and
   the clip member is adapted to engage the extensible pole and the foot member to maintain the foot member in a desired relationship relative to the extensible pole.

28. A method of forming a barrier comprising the steps of:
   providing at least one extensible pole assembly;
   attaching a foot member to the at least one extensible pole assembly;
   supporting a first attachment member on each foot member; and
   arranging a barrier member adjacent to each foot member;
   arranging a second attachment member adjacent to each foot member, where
      the second attachment member is magnetically attracted to the first attachment member;
      the magnetic attraction between the first and second attachment members holds the sheet material relative to the foot member;
   with the sheet member held relative to the foot member, arranging the at least one extensible pole assembly in a desired location between a floor surface and a ceiling surface; and
   engaging a clip member with the extensible pole and the foot member to maintain the foot member in a desired relationship relative to the extensible pole.

* * * * *